(12) United States Patent
Lafreniere et al.

(10) Patent No.: US 10,394,774 B2
(45) Date of Patent: *Aug. 27, 2019

(54) DETERMINING WHEN A CHANGE SET WAS DELIVERED TO A WORKSPACE OR STREAM AND BY WHOM

(71) Applicant: International Business Machines Corporation, Armonk, NY (US)

(72) Inventors: David Lafreniere, Kanata (CA); Andrew J. Niefer, Ottawa (CA); Michael F. Valenta, Kanata (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 844 days.

This patent is subject to a terminal disclaimer.

(21) Appl. No.: 14/921,137

(22) Filed: Oct. 23, 2015

(65) Prior Publication Data
US 2016/0196169 A1    Jul. 7, 2016

Related U.S. Application Data

(63) Continuation of application No. 14/588,678, filed on Jan. 2, 2015.

(51) Int. Cl.
*G06F 16/21* (2019.01)
*G06F 8/71* (2018.01)

(52) U.S. Cl.
CPC .............. *G06F 16/219* (2019.01); *G06F 8/71* (2013.01)

(58) Field of Classification Search
USPC ........................................................ 707/695
See application file for complete search history.

(56) References Cited

U.S. PATENT DOCUMENTS 8,655,850 B2 * 2/2014 Ngo .................. G06F 3/061
707/672
8,983,915 B2 * 3/2015 Mutalik ............ G06F 17/30162
707/690

(Continued)

OTHER PUBLICATIONS

Transmittal—List of IBM Patents or Patent Applications Treated as Related, 2 pg.

(Continued)

*Primary Examiner* — Sherief Badawi
*Assistant Examiner* — Raheem Hoffler
(74) *Attorney, Agent, or Firm* — Cuenot, Forsythe & Kim, LLC

(57) ABSTRACT

Each of a plurality of events associated with a workspace or stream are stored to a functional data structure. Each of the plurality of events includes at least an indication of when an operation in the workspace or stream occurred and who performed the operation. Nodes of a change set history tree corresponding to the events can be recursively identified until a node corresponding to a change set of interest is identified. Responsive to identifying the node corresponding to the change set of interest, the event corresponding to such node can be identified as an event that added the change set of interest to the workspace or stream. The indication of when the operation represented by the event occurred and who performed the operation can be retrieved from the subject event. The indication of when the operation represented by the event occurred, and who performed the operation, can be output.

4 Claims, 6 Drawing Sheets

(56) References Cited

U.S. PATENT DOCUMENTS

| | | | |
|---|---|---|---|
| 9,727,544 B2* | 8/2017 | Hunter | G06F 17/2288 |
| 2009/0171732 A1 | 7/2009 | Bobak et al. | |
| 2011/0161931 A1 | 6/2011 | Camelon et al. | |
| 2014/0075364 A1 | 3/2014 | Bragdon et al. | |
| 2014/0149365 A1 | 5/2014 | Minborg | |
| 2015/0006535 A1* | 1/2015 | Hayden | G06F 17/30412 707/737 |
| 2015/0012488 A1* | 1/2015 | van Rossum | G06F 17/30581 707/611 |
| 2015/0356207 A1 | 12/2015 | Reitman et al. | |
| 2016/0196289 A1 | 7/2016 | Lafreniere et al. | |

OTHER PUBLICATIONS

Lafreniere, D. et al., "Determining When a Change Set Was Delivered to a Workspace or Stream and by Whom", U.S. Appl. No. 14/588,678, filed Jan. 2, 2015, 33 pg.

"The Stream Browser," [online] retrieved Jul. 17, 2014, retrieved from the Internet: <http://www.accurev.com/download/docs/4.6.2_books/WebHelp/Stream_Browser.htm>, 12 pg.

Grace Period Disclosure: "Rational Team Concert 5.0.1 M1 Milestone New & Noteworthy," [online] IBM developerWorks (contributors David Lafreniere et al.), Jun. 11, 2014, retrieved from the Internet: <https://jazz.net/downloads/rational-team-concert/milestones/5.0.1M1>, 7 pg.

Grace Period Disclosure: Rational Team Concert 5.0.1, IBM developerWorks (contributors David Lafreniere et al.), Sep. 9, 2014, retrieved from the Internet: <https://jazz.net/downloads/rational-team-concert/releases/5.0.1?p=allDownloads>, 17 pg.

Grace Period Disclosure: "Viewing or Editing the Change History of Components," [online] IBM Knowledge Center (contributors David Lafreniere et al.), Jun. 16, 2014, retrieved from the Internet; <https://jazz.net/help-dev/clm/index.jsp?re=1&topic=/com.ibm.team.scm.doc/topics/t_scm_eclipse_history_comp.html&scope=null>, 1 pg.

Grace Period Disclosure: "Viewing the Baseline History of Components," [online] Rational Collaborative Lifecycle Management Solution 5.0.0, IBM Knowledge Center (contributors David Lafreniere et al.), Jun. 16, 2014, retrieved from the Internet: <http://www-01.ibm.com/support/knowledgecenter/SSYMRC_5.0.0/com.ibm.team.scm.doc/topics/t_scm_eclipse_baseline_history.html>, 1 pg.

Grace Period Disclosure: Hanson, J. et al., "Practicing Source Control Archaeology with Rational Team Concert," [online] IBM developerWorks, (contributors David Lafreniere et al.), Sep. 8, 2014, retrieved from the Internet: <https://jazz.net/library/article/447/>, 15 pg.

* cited by examiner

DETERMINING WHEN A CHANGE SET WAS DELIVERED TO A WORKSPACE OR STREAM AND BY WHOM

STATEMENT REGARDING PRIOR DISCLOSURES BY THE INVENTOR OR A JOINT INVENTOR

The following disclosure(s) are submitted under 35 U.S.C. 102(b)(1)(A):

DISCLOSURE(S): Rational Team Concert 5.0.1 M1 Milestone, IBM developerWorks (contributors David Lafreniere et al.), Jun. 11, 2014, pp. 1-7; Rational Team Concert 5.0.1, IBM developerWorks (contributors David Lafreniere et al.), Sep. 9, 2014, pp. 1-17; Viewing or editing the change history of components, IBM Knowledge Center (contributors David Lafreniere et al.), Jun. 16, 2014, p. 1; Viewing the baseline history of components, IBM Knowledge Center (contributors David Lafreniere et al.), Jun. 16, 2014, p. 1; Practicing source control archaeology with Rational Team Concert, IBM developerWorks, Jeff Hanson et al. (contributors David Lafreniere et al.), Sep. 8, 2014.

BACKGROUND

The present invention relates to version control systems, and more specifically, to change set based source control systems.

In a change set based control system, the particular configuration of an element, such as an element of an application or other software package, represented in a version tree is determined by combining an ordered sequence of change sets, which may be referred to as a change set history. A stream references a change set history and serves as a mechanism for sharing changes among users, such as computer programmers. In this regard, individual users can develop software elements in their own workspace, and save changes to the elements to a stream when changes to the elements are ready to be shared. In this model, change sets and change set history are regularly shared between streams in order to optimize usage of storage space.

SUMMARY

A computer-implemented method includes storing, using a processor, to a functional data structure a plurality of events associated with a workspace or stream. Each of the plurality of events can include at least an indication of when an operation in the workspace or stream occurred and who performed the operation. The computer-implemented method also can include identifying a change set that is of interest, identifying as a subject event a particular event stored in the functional data structure, and identifying as a previous event a particular event stored in the functional data structure that precedes the subject event. The computer-implemented method further can include identifying a set of nodes of a change set history tree corresponding to the subject event which are not present in the set of nodes of a change set history tree corresponding to the previous event, each node representing a change set delivered to the workspace or stream, and determining whether the set of nodes corresponding to the subject event, which are not present in the set of nodes of a change set history tree corresponding to the previous event, includes a node representing the change set that is of interest.

Responsive to determining that the change set of interest is not included in the set of nodes corresponding to the subject event, which are not present in the set of nodes of a change set history tree corresponding to the previous event, the computer-implemented method can include, until a set of nodes including the change set of interest is identified, recursively, re-identifying as the subject event the event currently identified as the previous event, identifying as the previous event a particular event stored in the functional data structure that precedes the re-identified subject event, and identifying a corresponding set of nodes of the change set history tree corresponding to the subject event which are not present in the set of nodes of a change set history tree corresponding to the previous event. The computer-implemented method also can include determining whether the set of nodes corresponding to the subject event, which are not present in the set of nodes of a change set history tree corresponding to the previous event, includes a node representing the change set that is of interest.

Responsive to determining that the corresponding set of nodes includes a node representing the change set that is of interest, the subject event can be identified as an event that added the change set of interest to the workspace or stream. Further, the indication of when the operation represented by the event occurred and who performed the operation can be retrieved from the subject event. The indication of when the operation represented by the event occurred, and who performed the operation, can be output.

DETAILED DESCRIPTION

Figure 1:
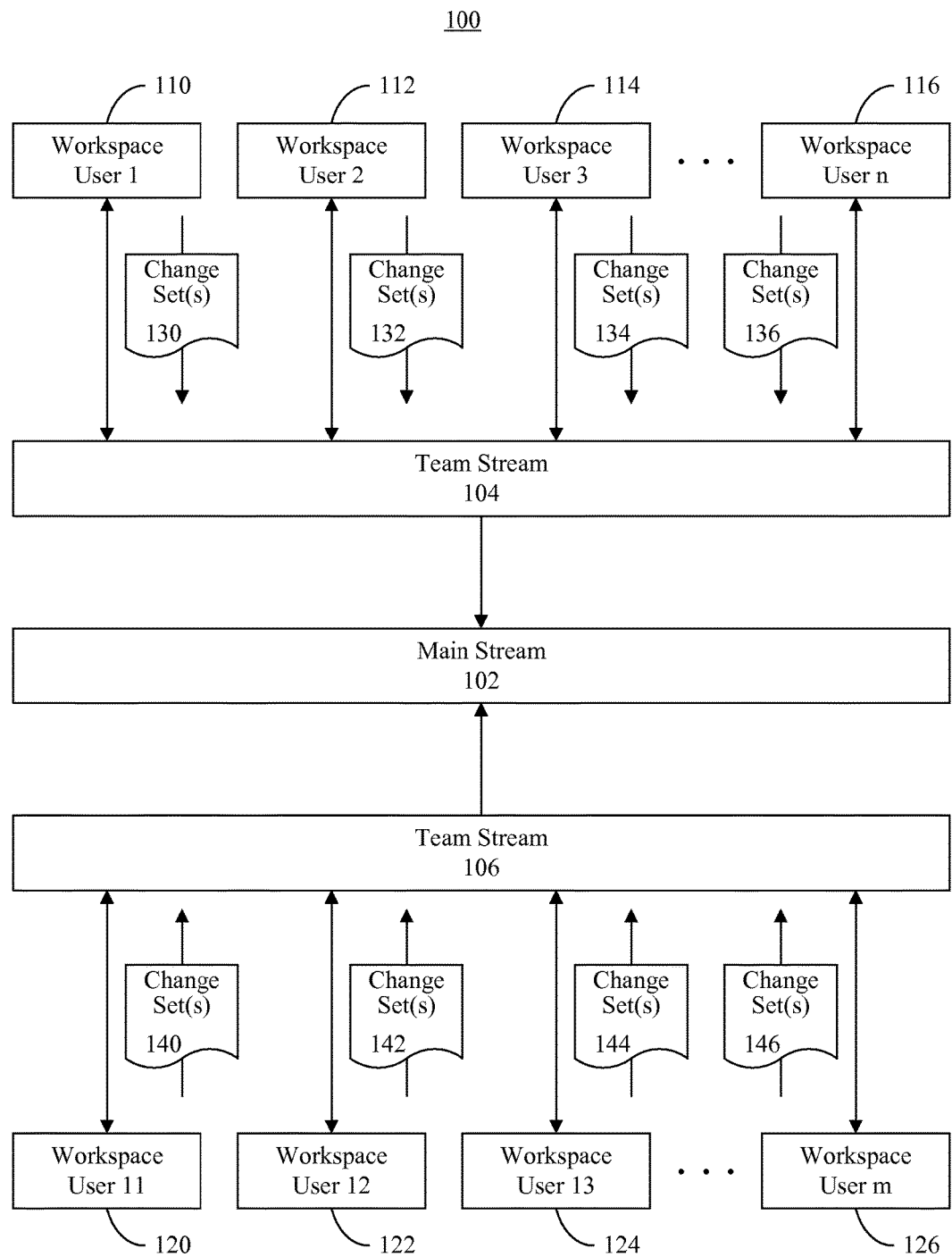
FIG. 1 is a block diagram illustrating an example of components of a change set based source control system.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

The present arrangements relate to version control systems, and more specifically, to change set based source control systems. Several definitions that apply throughout this document now will be presented.

As defined herein, the term "change set" means a group of one or more related changes to artifacts (e.g., source code, libraries, files, folders, symbolic links, etc.) of an element (e.g., software package, application, module, or the like) in a workspace or stream. A change set is represented by a node in a change set history tree. A particular change set may be shared among a plurality of streams, for example if the change set is applicable to more than one stream.

As defined herein, the term "set of change sets" means one or more change sets.

As defined herein, the term "change set history tree" means a functional data structure representing various change sets applied to an element (e.g., software package, application, file, module, or the like) in a logically organized manner. A change set history tree includes a plurality of nodes connected in a hierarchical manner, each node representing one or more change sets applied to an element. A particular change set may be represented by one or more nodes. For example, a change set introduced to two or more streams can be represented by two or more nodes in the change set history tree. A particular node may be a parent node to a plurality of child nodes, in which case each child node represents the beginning of a new branch in the change set history tree. A change set history tree may be referred to herein as a "change set history tree."

As defined herein, the term "version tree" means a data structure representing various versions of an element (e.g., software package, application, file, module, or the like) in a logically organized manner. The version tree also can represent any merge operations that have been performed on versions of the element. A version tree includes a plurality of nodes connected in a hierarchical manner, each node representing a specific version of the element. A specific version of the element may be derived from a previous version of the element having one or more change sets applied to the element. A particular node may be a parent node to a plurality of child nodes, in which case each child node represents the beginning of a new branch in the version tree.

As defined herein, the term "workspace" means a modifiable configuration of artifacts (e.g., source code, libraries, files, folders, symbolic links, etc.) containing resources of an element (e.g., software package, application, module, or the like) being developed by a particular user, which points to a particular node of a version tree for the element to which the stream corresponds. A workspace also may point to a particular node in a change set history tree for the element to which the stream corresponds. A workspace can be updated to change the particular node of the version tree to which the workspace points, which results in a change to the content of the workspace, even if other aspects of the workspace have not changed. A workspace for a user typically is not shared with other users.

As defined herein, the term "stream" means a modifiable configuration of artifacts (e.g., source code, libraries, files, folders, symbolic links, etc.) containing resources of an element (e.g., software package, application, module, or the like) being developed by a software development team, which points to a particular node of a version tree for the element to which the stream corresponds. A stream also may point to a particular node in a change set history tree for the element to which the stream corresponds. A stream is updated by development team members to save changes to the element and make the changes available to other development team members. When a user desires to make changes in the user's workspace available to other members of the software development team, the user saves the changes to the stream. Responsive to changes being saved to a stream, a new node representing the changes typically is added to the version tree for the element. A stream can be updated to change the particular node of the version tree to which the stream points, which results in a change to the content of the stream, even if other aspects of the stream have not changed.

As defined herein, the term "event" means data representing an operation performed in a computing environment and detected by a processor executing program code. Examples of an event includes, but are not limited to, data representing a pointer change for a data stream, data representing delivery of one or more change sets to a stream, and the like.

As defined herein, the term "functional data structure" means a computer readable data structure stored to a computer readable storage medium. Examples of a functional data structure include, but are not limited to, a database, a data table, a computer readable file, and the like.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores data and/or program code for use by or in connection with an instruction execution system, apparatus, or device. As defined herein, a "computer readable storage medium" is not a transitory, propagating signal per se.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real time" means a level of processing responsiveness that a user or system senses as sufficiently immediate for a particular process or determination to be made, or that enables the processor to keep up with some external process.

As defined herein, the term "output" means storing in memory elements, writing to display or other peripheral output device, playing audible notifications, sending or transmitting to another system, exporting, and/or the like.

As defined herein, the term "automatically" means without user intervention.

As defined herein, the term "user" means a person (i.e., a human being). An example of a user is a computer programmer who develops computer program code.

FIG. 1 is a block diagram illustrating an example of various components 100 of a change set based source control system. The components 100 can include a main stream 102, a team stream 104 and a team stream 106. The components 100 also can include any number of additional team streams. The components 100 also can include a plurality of workspaces 110, 112, 114, 116, 120, 122, 124, 126.

Workspaces 110-126 and streams 102-106 can contain pointers to nodes of a version tree for the element to which the workspaces 110-126 and streams 102-106 correspond. Workspaces 110-126 and streams 102-106 also can contain pointers to a change set history tree. The change set history tree can contain a plurality of nodes, each of which represents a particular change set 130-146 applied to the element. Each branch of the version tree can represent a particular sequence of change sets 130-146, represented in the change set history tree, delivered to a particular stream 102-106, with each node of the version tree representing a particular set of change sets 130-146 delivered to the stream 102-106. Thus, a particular branch of the version tree may contain a plurality of different change sets 130-146. In some cases, a particular change set 130-146 may be applied to multiple branches of the version tree. Also, different branches of the version tree may contain the same change sets 130-146, but in a different order.

When developing software elements, users (e.g., computer programmers) developing computer program code can work on elements in their own workspaces 110-126. When a user desires to share the changes to the elements with other team members, the user can deliver one or more change sets 130, 132, 134, 136, 140, 142, 144, 146 to a team stream 104, 106 of the user's development team. Each change set can include a before state and an after state of each of the artifacts changed by the change set. Sometimes, a user may deliver change sets to more than one team stream. In illustration, a user operating in the workspace 110 may deliver change sets 130 not only to the team stream 104, but also to the team stream 106 of one or more other development teams, for example when the change sets are applicable to such other team streams.

Figure 2:
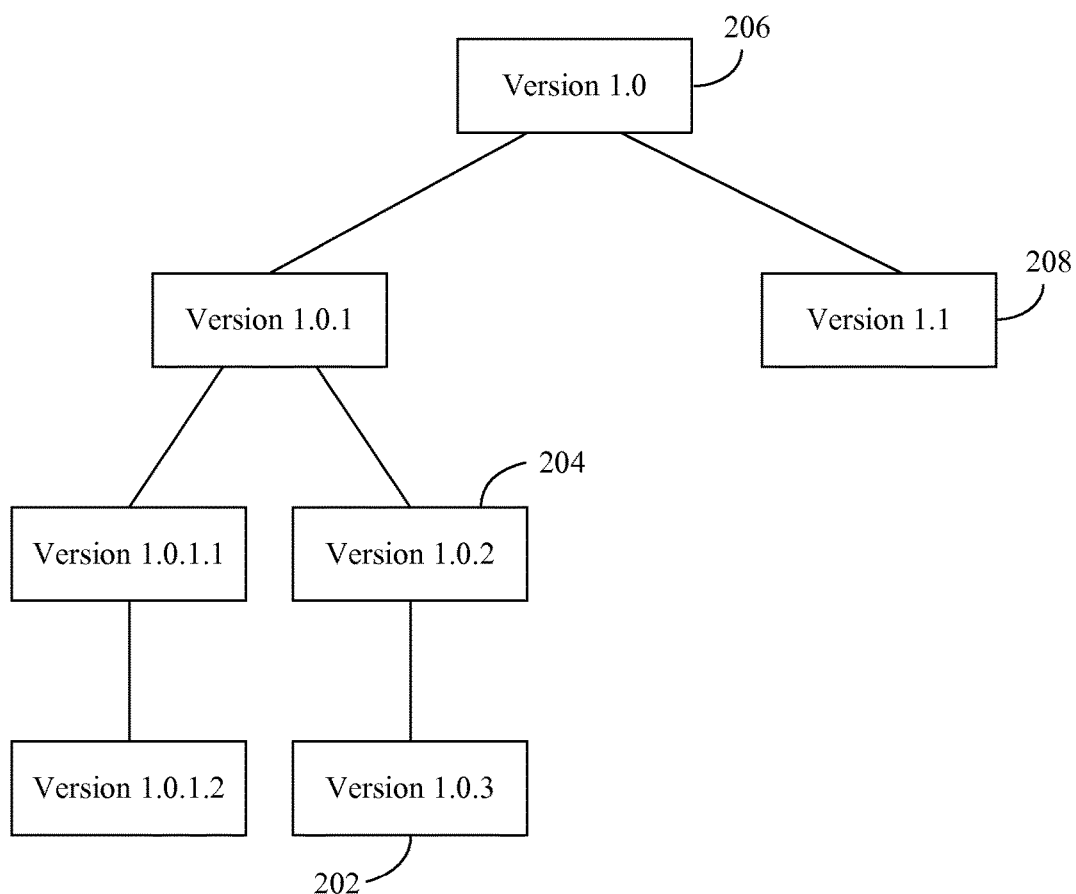
FIG. 2 illustrates an example of a version tree.

When a set of one or more change sets 130-146 are delivered to a team stream 104, 106, a node is added in the appropriate branch of a version tree representing versions of the software element being developed. In illustration, referring to the version tree 200 of FIG. 2, if the user's workspace 110 points to version 1.0.2, and the user delivers one or more change sets 130 to the team stream 104, a new node 202 representing a new version 1.0.3 can be added to the version tree 200. The node 202 can include a pointer to a parent node 204 that immediately precedes the node 202. Thus, the node 202 can be considered a child node of the parent node 204 that immediately precedes the child node 202 in the version tree 200. The node 202 can include data indicating the change sets 130 applied to the previous version of the element to arrive at the current version. A version pointer of the team stream 104 can be updated accordingly to point to the new node 202.

Figure 3:
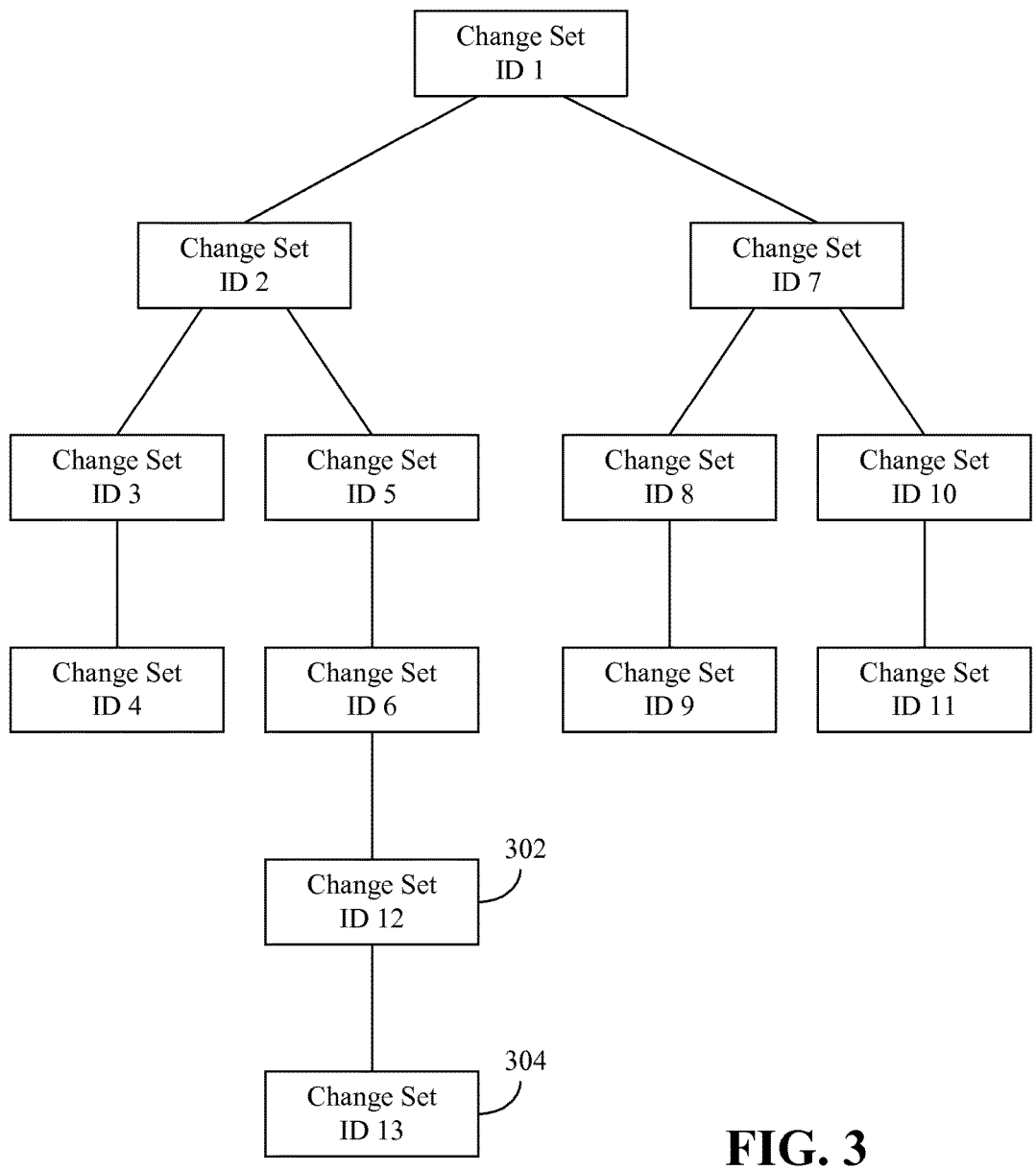
FIG. 3 illustrates an example of a change set history tree.

In addition, referring to the change set history tree 300 of FIG. 3, for each of the change sets 130 that are delivered to the team stream 104, a new node 302, 304 can be added to the change set history tree 300. In this example, the set of change sets 130 includes two change sets. Thus, nodes 302, 304 can be added to the change set history tree 300 in the order in which the change sets are delivered to the stream 104. In this example, the node 302 that immediately precedes the node 304 can be considered a parent node to the node 302, and the node 302 can be considered a child node of the node 304. Each node, when added, can be assigned a unique identifier. The unique identifier can be, for example, a hash value calculated based on data represented by the node, or any other suitable identifier that is unique to the node to which the identifier is assigned. The node 202 of the version tree 200 can include pointers that point to the nodes 302, 304 corresponding to the set of change sets 130. Hence, there typically is a direct correlation between a node of the version tree 200 and the nodes of the change set history tree 300 representing the change sets 130 applied to the team stream 104 to generate the new version of the element. A change set history pointer of the team stream 104 can be updated accordingly to point to the nodes 304 of the change set history tree 300 corresponding to the most recent of the applied change sets 130.

When the team stream 104 is ready to be merged into another stream, the team stream 104 can be delivered to the other stream. For example, the team stream 104 can be delivered to the main stream 102. In response to the team stream 104 being delivered, a new node in the version tree 200 can be added, and the version pointer of the main stream 102 can be updated to point to that node. For example, if the main stream points to a node 206 immediately before the team stream 104 is merged into the main stream 102, a new node 208 can be added to the version tree 200, for example as a child of the node 206, and the version pointer of the main stream can be updated to point to the node 208. The newly created node 208 can include pointers to each of the change sets 130-136 delivered to the main stream 102 by the team stream 104. Thus, there can be a direct correspondence between the new node 208 and the nodes of the change set history tree 300 representing the change sets 130-136 delivered to the main stream 102 by the team stream 104. Further, a change set history pointer of the main stream 102 can be updated to point to the nodes of the change set history tree 300 representing the most recent of the change sets 130-136 applied to the main stream 102 as a result of the merge.

Depending on development requirements, a pointer of a workspace 110-126 or stream 102-106 may be changed to point to a different node of the version tree 200. For example, a user may enter a user input detected by the change set based control system. The user input can perform (e.g., trigger) an operation to change the pointer of the workspace 110-126 or stream 102-106 to point to a different node. The different node may exist in the same branch of the version tree 200 or a branch of the version tree 200 that is different than the node to which the workspace or stream previously pointed. Because each node of the version tree 200 correlates to one or more nodes of the change set history tree, moving a pointer of a workspace 110-126 or stream 102-104 from one node to another in the version tree 200 also moves the pointer of the workspace 110-126 or stream 102-104 from one node to another in the change set history tree 300. Responsive to the pointer of the workspace 110-126 or stream 102-106 to point to a another node of the version tree 200, the set of nodes of the change set history tree 300 can be automatically identified. In illustration, the correlation between the other node of the version tree 200 and the set of nodes of the change set history tree 300 can be determined, for example based on information contained in the other node.

Similarly, moving a pointer of a workspace 110-126 or stream 102-104 from one node to another in the change set history tree 300 also moves the pointer of the workspace 110-126 or stream 102-104 from one node to another in the version tree 200. Thus, a user need not actually move a pointer to the version tree for that pointer to be moved. Instead, the pointer to the version tree can be automatically moved from one node to another in response to the user moving a pointer from one node to another in the change set history tree 300. When such an operation occurs (e.g., as a result of a user input to perform the operation), the change sets 130-146 incorporated into the workspace 110-126 or stream 102-104 typically are changed, even though other changes to the workspace 110-126 or stream 102-104 may not have been made.

Although information regarding the user who generated a particular change set, and when the change set was generated, may be readily available, it may not be readily apparent who caused one or more change sets 130-146 to be incorporated into a workspace 110-126 or stream 102-104 as a result of performing an operation changing of the version tree pointer to point to a different node of the version tree 200.

In accordance with the arrangements described herein, the user who caused one or more change sets to be incorporated into a workspace or stream as a result of changing the pointer to point to a different node on the version tree 200 (or point to a different node on the change set history tree 300), and when such change sets were incorporated into the workspace or stream, can be automatically determined. In illustration, responsive to operations taking place in workspaces 110-126 and streams 102-104, events can be generated. The events can be stored to a functional data structure, for example a data table, in a chronological order. Thus, the data table can contain an event history list.

Figure 4:
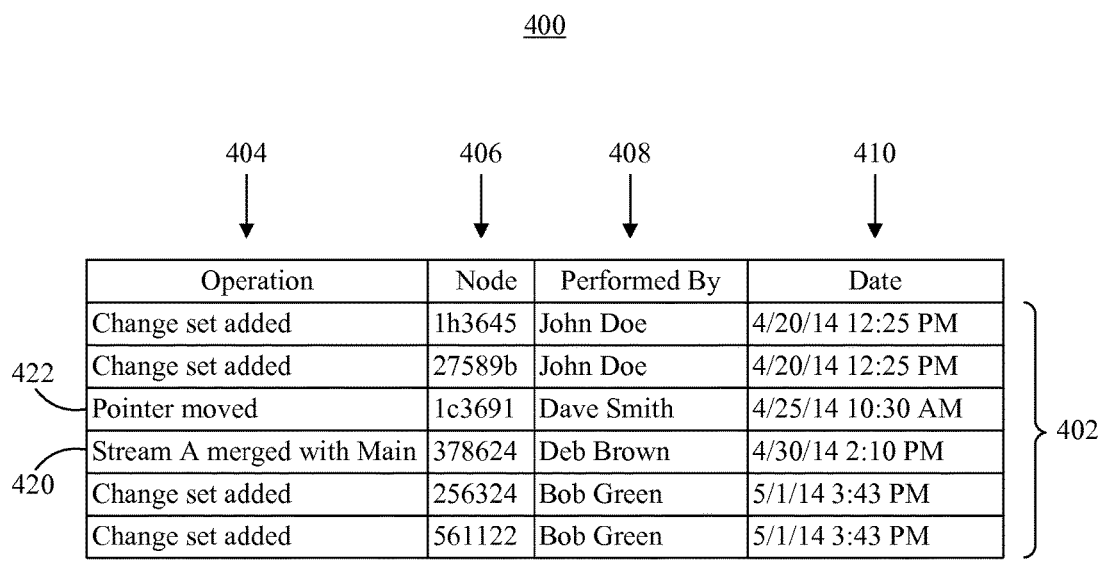
FIG. 4 illustrates an example of an event history list.

FIG. 4 illustrates an example of an event history list 400, which contains a plurality of events 402 associated with a workspace or stream. Each event can correspond to a set of one or more nodes of the change set history tree 300. The event history list 400 can include a column 404 which indicates, for each event, a type of operation performed by an operation represented by the event. The event history list 400 also can include a column 406 which indicates, for each event, a node in the version tree 200 or change set history tree 300 that is newly created or newly pointed to as a result of the operation. The event history list 400 also can include a column 408 that indicates, for each event, who performed the operation. The event history list 400 further can include a column 410 which indicates, for each event, when the operation was performed. In the example event history list 400, an event 420 represents on operation in which team stream A was merged with a main stream. An event 422, which immediately precedes the event 420, represents on operation in which a pointer of a stream was changed to point to different node on the version tree 200 (or the change set history tree 300). From the event 422, however, it is not clear which change sets were incorporated into the stream as a result of the operation.

Figure 5:
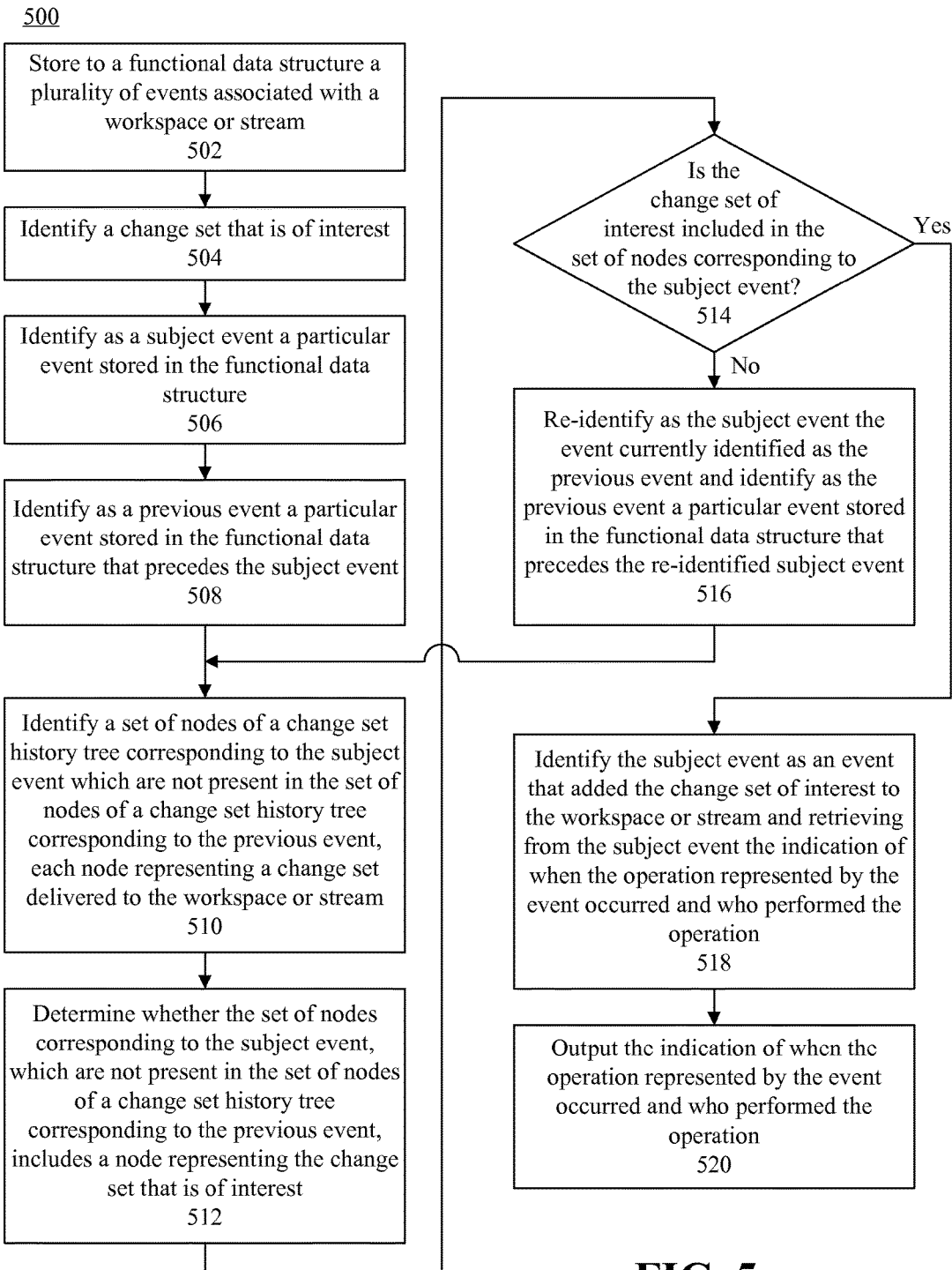
FIG. 5 is a flow chart illustrating an example of a method of determining when a change set was delivered to a workspace or stream and by whom.

FIG. 5 is a flow chart illustrating an example of a method 500 of determining when a change set was delivered to a workspace or stream and by whom. At step 502, each of a plurality of events associated with a workspace or stream can be stored to a functional data structure (e.g., the event history list 400). Each of the plurality of events can include at least an indication of when an operation in the workspace or stream occurred and who performed the operation. At step 504, a change set that is of interest can be identified. In one arrangement, the change set that is of interest can be a change set selected by a user. For example, a user can enter one or more user inputs into the change set based source control system selecting the change set and initiating the method 500 to be performed for that change set. In another arrangement, each change set incorporated into a stream can be identified, and the method 500 can be performed for each of the change sets. As the method 500 is performed for any particular change set, that change set can be considered to be the change set that is of interest. In another arrangement, the method 500 can be performed on a subset of the change sets incorporated into a stream, and the subset can be selected in any desired manner.

At step 506, a particular event stored in the functional data structure can be identified as a subject event. The event identified as the subject event can be, for example, a most recent event. At step 508, a particular event stored in the function data structure that precedes the subject event can be identified as a previous event. The node identified as the previous event can be, for example, an event that immediately precedes the subject event. At step 510, a set of nodes of a change set history tree corresponding to the subject event, which are not present in the set of nodes of a change set history tree corresponding to the previous event, can be identified. Each node can represent a change set delivered to the workspace or stream.

At step 512, a determination can be made as to whether the set of nodes corresponding to the subject event, which are not present in the set of nodes of a change set history tree corresponding to the previous event, includes a node representing the change set that is of interest. Referring to decision box 514, if the change set of interest is not included in the set of nodes corresponding to the subject event, which are not present in the set of nodes of a change set history tree corresponding to the previous event, the process can proceed to step 516. At step 516, the event currently identified as the previous event can be re-identified as the subject event. An event in the functional data structure that precedes the re-identified subject event can be identified as the previous event. For example, the event that immediately precedes the event re-identified as subject event can be identified as the previous event.

The process then can return to step 510. Steps 510-516 can be performed recursively until a determination is made at decision box 514 that the set of nodes corresponding to the subject event, which are not present in the set of nodes of a change set history tree corresponding to the previous event, includes a node representing the change set that is of interest. Responsive to such determination being made, the process can continue to step 518. At step 518, the subject event can be identified as an event that added the change set of interest to the workspace or stream. The indication of when the operation represented by the event occurred and who performed the operation can be retrieved from the subject event. At step 520, the indication of when the operation represented by the event occurred and who performed the operation can be output. For example, such information can be written to a display, for example via a client device, stored to a memory element, and/or the like.

Users can review the information output at step 520 to analyze the history of change sets affecting a particular workspace or stream. In one arrangement, a list of change sets incorporated into a workspace or stream can be presented. For each change set, an indication of when the operation that incorporated the change set into the workspace or stream occurred, and who performed the operation, can be presented in a manner that clearly associates the information with the particular change set. Such an arrangement allows users to efficiently review multiple change sets applied to a workspace or stream.

Figure 6:
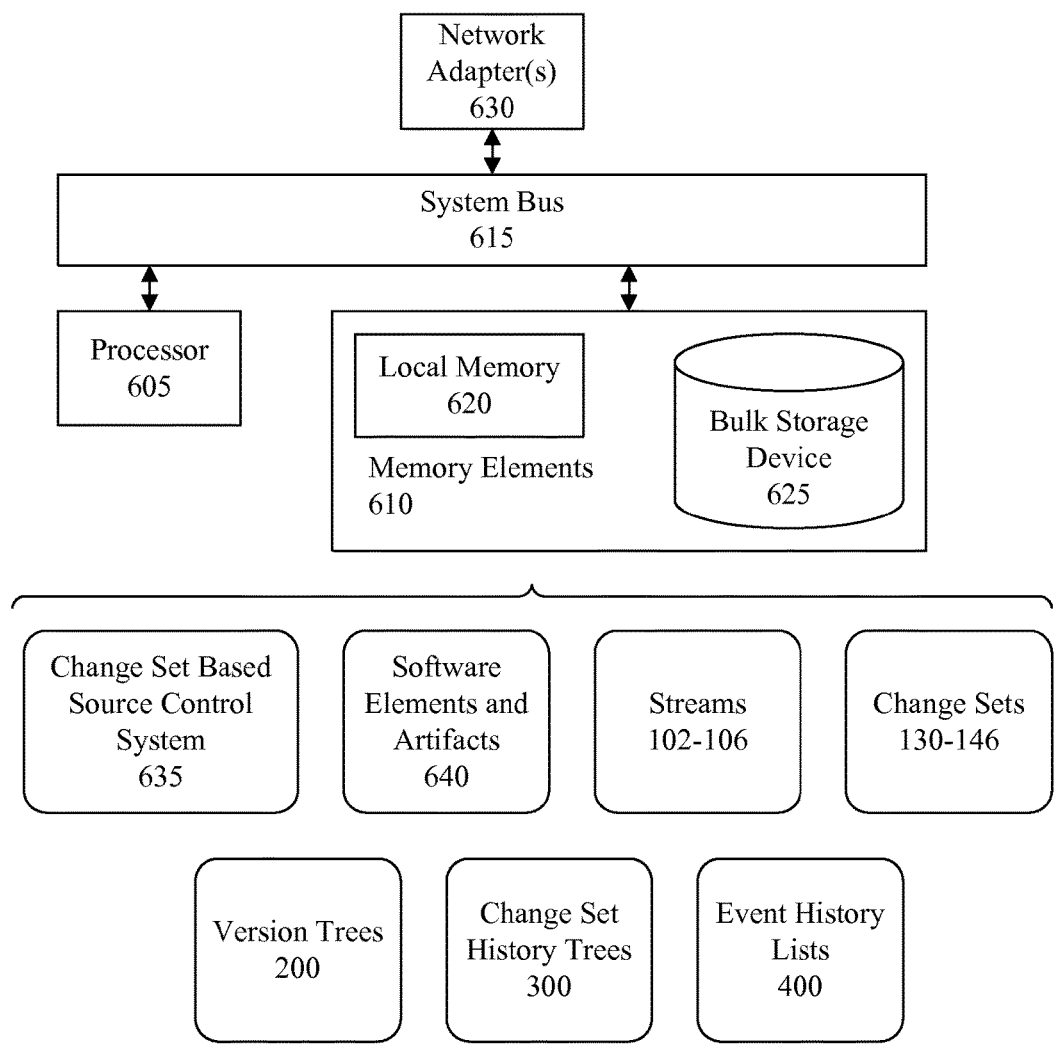
FIG. 6 is a block diagram illustrating example architecture for a data processing system in accordance with an embodiment disclosed within this specification

FIG. 6 is a block diagram illustrating example architecture for a data processing system 600 in accordance with an embodiment disclosed within this specification. The data processing system 600 can be configured to determine when a change set was delivered to a workspace or stream, and by whom.

The data processing system 600 can include at least one processor 605 (e.g., a central processing unit) coupled to memory elements 610 through a system bus 615 or other suitable circuitry. As such, the data processing system 600 can store program code within the memory elements 610. The processor 605 can execute the program code accessed from the memory elements 610 via the system bus 615. It should be appreciated that the data processing system 600 can be implemented in the form of any system including a processor and memory that is capable of performing the functions and/or operations described within this specification. For example, the data processing system 600 can be implemented as a server or the like.

The memory elements 610 can include one or more physical memory devices such as, for example, local memory 620 and one or more bulk storage devices 625. Local memory 620 refers to random access memory (RAM) or other non-persistent memory device(s) generally used during actual execution of the program code. The bulk storage device(s) 625 can be implemented as a hard disk drive (HDD), solid state drive (SSD), or other persistent data storage device. The data processing system 600 also can include one or more cache memories (not shown) that provide temporary storage of at least some program code in order to reduce the number of times program code must be retrieved from the bulk storage device 625 during execution.

Input/output (I/O) devices can be coupled to the data processing system 600. The I/O devices can be coupled to the data processing system 600 either directly or through intervening I/O controllers. For example, one or more network adapters 630 can be coupled to data processing system 600 to enable the data processing system 600 to become coupled to other systems, computer systems, remote printers, and/or remote storage devices through intervening private or public networks. Modems, cable modems, transceivers, and Ethernet cards are examples of different types of network adapters 630 that can be used with the data processing system 600. In one arrangement, one or more bulk storage devices 625 can be coupled to the data processing system 600 via the network adapter(s) 630.

Via the network adapters 630, the data processing system 600 can host client sessions for users connecting to the data processing system 600 via other computer systems. As such, the data processing system 600 can output data to, and received data from, such other computer systems. In this regard, such other computer systems can be client devices. The data processing system 600 can interact with client devices as is well known to those skilled in the art. For example, data output by the data processing system 600 can be stored locally by the client devices, presented by the client devices via a display, sent to printers by the client devices, etc. Further, user inputs, data, commands, etc. can be conveyed from the client devices to the data processing system 600 to enter data and perform various operations described herein.

As pictured in FIG. 6, the memory elements 610 can store various data and software items represented and/or described with reference in FIGS. 1-5. Such items include a change set based control system 635 (including components 100 of the change set based control system), software elements and artifacts 640 maintained by the change set based control system 635, streams 102-106, change sets 130-146, version trees 200, change set history trees 300, event history lists 400, and the like. Being implemented in the form of executable program code, the change set based control system 635 can be executed by the data processing system 600 and, as such, can be considered part of the data processing system 600. Moreover, the software elements and artifacts 640, streams 102-106, change sets 130-146, version trees 200, change set history trees 300, event history lists 400 each are functional data structures that impart functionality when employed as part of the data processing system 600 of FIG. 6.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," or similar language means that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   storing, using a processor, to a functional data structure a plurality of events associated with a workspace or stream, each of the plurality of events comprising at least an indication of when an operation in the workspace or stream occurred and who performed the operation;
   receiving a user input performing an operation to move a pointer of the workspace or stream from a first node of a change set history tree to a second node of the change set history tree;
   identifying a change set that is of interest, wherein the change set that is of interest is incorporated into the workspace or stream responsive to the user input performing the operation to move the pointer of the workspace or stream from the first node of the change set history tree to the second node of the change set history tree;

identifying as a subject event a particular event stored in the functional data structure;

identifying as a previous event a particular event stored in the functional data structure that precedes the subject event;

identifying a set of nodes of a change set history tree corresponding to the subject event which are not present in a set of nodes of a change set history tree corresponding to the previous event, each node representing a change set delivered to the workspace or stream, and determining whether the set of nodes corresponding to the subject event, which are not present in the set of nodes of the change set history tree corresponding to the previous event, includes a node representing the change set that is of interest;

responsive to determining that the change set of interest is not included in the set of nodes corresponding to the subject event, which are not present in the set of nodes of a change set history tree corresponding to the previous event, until a set of nodes including the change set of interest is identified, recursively:

re-identifying as the subject event the event currently identified as the previous event and identifying as the previous event a particular event stored in the functional data structure that precedes the re-identified subject event; and identifying a corresponding set of nodes of the change set history tree corresponding to the subject event which are not present in the set of nodes of a change set history tree corresponding to the previous event, and determining whether the set of nodes corresponding to the subject event, which are not present in a set of nodes of a change set history tree corresponding to the previous event, includes a node representing the change set that is of interest; and responsive to determining that the corresponding set of nodes includes the node representing the change set that is of interest, identifying the subject event as an event that added the change set of interest to the workspace or stream and retrieving from the subject event the indication of when the operation represented by the event occurred and who performed the operation; and outputting the indication of when the operation represented by the event occurred and who performed the operation.

2. The computer-implemented method of claim 1, wherein the particular event is a most recent event stored in the functional data structure.

3. The computer-implemented method of claim 1, wherein the event that precedes the subject event is an event that immediately precedes the subject event in the functional data structure.

4. The computer-implemented method of claim 1, wherein the change set that is of interest is a change set selected by a user.

* * * * *